(12) United States Patent
Akiyama

(10) Patent No.: US 6,813,713 B2
(45) Date of Patent: Nov. 2, 2004

(54) DATA PROCESSING APPARATUS CAPABLE OF DEALING WITH ILLEGAL EXTERNAL INPUT IN AN OPERATIVE STATE AND PREVENTING USELESS POWER CONSUMPTION IN A STOPPED STATE

(75) Inventor: Kazuhiro Akiyama, Kanagawa (JP)

(73) Assignee: NEC Electronics Corporation, Kanagawa (JP)

(*) Notice: Subject to any disclaimer, the term of this patent is extended or adjusted under 35 U.S.C. 154(b) by 586 days.

(21) Appl. No.: 09/970,528

(22) Filed: Oct. 4, 2001

(65) Prior Publication Data

US 2002/0049921 A1 Apr. 25, 2002

(30) Foreign Application Priority Data

Oct. 19, 2000 (JP) ........................................ 2000-319287

(51) Int. Cl.[7] ............................. G06F 11/30; G06F 1/32
(52) U.S. Cl. ....................... 713/200; 713/400; 713/500; 713/502
(58) Field of Search ................................. 713/200, 400, 713/500, 502

(56) References Cited

U.S. PATENT DOCUMENTS 5,715,256 A * 2/1998 Mohd et al. ................. 714/726
6,266,773 B1 * 7/2001 Kisor et al. .................. 713/200

FOREIGN PATENT DOCUMENTS

JP  403218130 A * 9/1991 ........... H04B/10/02
JP  404062614 A * 2/1992 ............. G06F/1/32

OTHER PUBLICATIONS

IBM TDB, "Technique for Monitoring a Computer System's Activity for the Purpose of Power Management of a Dos–Compatible System", vol. 33, Issue 4, pp. 474–477, Sep. 1, 1990.*

* cited by examiner

Primary Examiner—Rehana Perveen
(74) Attorney, Agent, or Firm—Scully, Scott, Murphy & Presser

(57) ABSTRACT

A data processing apparatus can execute a variety of operations by means of a data processing circuit and so on in an operative state and deal with illegal external inputs by means of an input monitor circuit, and can temporarily stop such components in a stopped state to prevent useless power consumption. Also, a clock counter circuit counts a clock signal fed from the outside when an operation control circuit temporarily stops the input monitor circuit and data processing circuits, and as the count number reaches a predetermined number, a monitor start circuit restarts the temporarily stopped monitor circuit, so that the data processing apparatus can deal with illegal external inputs even in a stopped state.

4 Claims, 3 Drawing Sheets

DATA PROCESSING APPARATUS CAPABLE OF DEALING WITH ILLEGAL EXTERNAL INPUT IN AN OPERATIVE STATE AND PREVENTING USELESS POWER CONSUMPTION IN A STOPPED STATE

BACKGROUND OF THE INVENTION

1. Field of the Invention

The present invention relates to a data processing apparatus which is capable of executing a variety of operations as well as dealing with illegal external inputs in an operative state, and temporarily stopping components associated with the operations to prevent useless power consumption in a stopped state.

2. Description of the Related Art

At present, data processing circuits for executing a variety of data processing, referred to as ALU (Arithmetic and Logical Unit) and so on, have been used in practice and utilized in a variety of fields. Since such a data processing circuit executes data processing in synchronization with a clock signal, a data processing apparatus containing the data processing circuit typically contains a clock generator circuit as well.

However, there are portable data processing apparatuses which are mounted on a data processing terminal station and operated integrally therewith. In some cases, such portable data processing apparatuses do not internally generate a clock signal but are supplied with a clock signal from associated data processing terminal stations. Also, since portable data processing apparatuses generally use a battery as a power source, some of them stop useless data processing to save power consumption.

A prior art example of such data processing apparatus will be described below with reference to FIG. 1. First, a data processing apparatus 100 illustrated herein as a prior art example comprises ALU 101 as a data processing circuit which is connected to bus line 102.

Connected to bus line 102 are program memory 103, data memory 104, general register 105, a plurality of I/Os (Input/Output) 106, and soon. Program memory 103 is connected to program counter 107 and decoder 108.

Decoder 108 is connected to standby controller 109 which functions as an operation control circuit. Standby controller 109 in turn is connected to INT (Interrupt) 110 and IAD (Illegal Access Detector) 111 which functions as an input monitor circuit.

Data processing apparatus 100 is formed as a portable type one which is mounted to a separated at a processing terminal station (not shown), and also has an external input terminal and a clock input terminal (not shown).

The external input terminal is connected to an external output terminal of the data processing terminal station to receive a variety of data and a variety of signals from the data processing terminal station, while the clock input terminal is connected to a clock output terminal of the data processing terminal station to receive a clock signal from the data processing terminal station.

Program memory 103 comprises, for example, EEPROM (Electrically Erasable Programmable Read Only Memory) or a flash memory, and stores an operation program comprised of a variety of instructions.

Program counter 107 is responsive to a variety of signals fed through the external input terminal from the outside, for example, to specify an address in program memory 103 at which an instruction to be executed is stored.

Decoder 108 reads an instruction from program memory 103 at an address specified by program counter 107, and decodes this instruction to generate a variety of control signals which are then supplied to associated components such as ALU 101.

ALU 101 executes a variety of data processing in synchronization with the clock signal fed through the clock input terminal from the outside corresponding to a variety of data fed through the external input terminal from the outside; a variety of data temporarily stored in data memory 104; an operation program supplied thereto from program memory 103 through decoder 108; and so on.

Data memory 104, comprising, for example, RAM (Random Access Memory), temporarily stores data which is to be processed by ALU 101. General register 105, comprising a general-purpose register, temporarily holds a variety of data before processing, in the middle of processing, and after the processing.

I/Os 106, which are peripheral circuits each having a variety of functions, is integrally controlled by ALU 101. IAD 111 monitors a variety of data and a variety of signals fed from the outside, and executes predetermined counter-operations such as resetting of the entire apparatus, when it determines an external input as improper.

INT 110 receives an interrupt signal fed from the outside, an interrupt signal internally generated by any I/O 106, and so on, and instructs ALU 101 or standby controller 109 to execute interrupt processing corresponding to a received interrupt signal.

Standby controller 109 temporarily stops the components such as IAD 111, ALU 101 and I/Os 106 in response to a predetermined condition, for example, execution of a stop instruction, and so on, and restarts such temporarily stopped components in response to a predetermined condition such as an interrupt fed to INT 110.

Data processing apparatus 100 configured as described above can be mounted to a separate data processing terminal station, and execute a variety of data processing in accordance with a variety of data and a clock signal supplied thereto from the data processing terminal station.

In this event, since program counter 107 specifies an address in program memory 103 in response to a variety of externally fed signals, an instruction at this specified address is read from program memory 103 and decoded to a control signal by decoder 108.

Since this control signal is supplied to associated components such as ALU 101, which, for example, executes a variety of data processing in synchronization with the clock signal fed through the clock input terminal from the external data processing terminal station in accordance with a variety of data fed through the external input terminal from the external data processing terminal station and an operation program supplied from program memory 103 through decoder 108.

It should be noted that a variety of data and a variety of signals fed to data processing apparatus 100 from the outside as described above are monitored at all times by IAD 111, so that if an illegal input, such as an input which does not comply with a standard, is detected by IAD 111, IAD 111 resets the entire apparatus.

Also, in data processing apparatus 100, a stop instruction in program memory 103 is decoded to a stop signal by decoder 108 in response to a predetermined condition, and this stop signal is supplied to standby controller 109. Upon receipt of the stop signal, standby controller 109 temporarily stops the components such as IAD 111, ALU 101 and I/Os 106, there by making it possible to prevent useless power consumption in this stopped state.

Since INT 110 restarts temporarily stopped components in response to a predetermined condition such as an interrupt fed thereto even in a stopped state, this permits data processing apparatus 100 to restore a normal operative state.

Data processing apparatus 100 as described above can temporarily stop its components such as ALU 101 and IAD 111 to prevent useless power consumption, restore a normal operative state even from the stopped state, and deal with illegal external inputs by means of IAD 111 in the normal operative state.

However, since IAD 111 is also inoperative in a stopped state, data processing apparatus 100 cannot deal with illegal external inputs. To solve this problem, it is contemplated that IAD 111 is left operative at all times, in which case, however, IAD 111 consumes power even in a stopped state.

SUMMARY OF THE INVENTION

The present invention has been made in view of the problem as mentioned above, and its object is to provide at least one of a data processing apparatus and system which are capable of dealing with illegal external inputs without consuming power uselessly nothing in a stopped state.

In the data processing apparatus of the present invention, an operation program comprised of a variety of instructions is stored in a program memory, so that when a variety of data and a variety of signals are fed to an external input terminal from the outside and a clock signal is fed to a clock input terminal from the outside, a data processing circuit executes a variety of data processing in synchronization with the externally fed clock signal in accordance with the variety of externally fed data and the operation program stored in the program memory.

In this event, an input monitor circuit is monitoring the variety of data and the variety of signals fed from the outside, and executes a predetermined counter-operation when it determines any of them are improper, so that the data processing apparatus can deal with an illegal external input in an operative state. Also, since an operation control circuit controls operations involved in temporarily stopping and restarting the input monitor circuit and data processing circuit, it is possible to prevent useless power consumption in a stopped state, and also restore an operative state from the stopped state.

Then, a clock counter circuit counts a clock signal fed through the clock input terminal from the outside while the operation control circuit temporarily stops the input monitoring circuit and data processing circuit, and as the count number of the clock counter circuit reaches a predetermined number, a monitor start circuit restarts the input monitor circuit temporarily stopped by the operation control circuit.

Therefore, the data processing apparatus can deal with an illegal external input even in a stopped state when the externally fed clock signal reaches the predetermined count, and can even prevent a useless increase in power consumption in a stopped state since the clock counter circuit consumes an extremely small amount of power.

As another aspect of the present invention, a predetermined count number has been set in a register circuit, and a comparator compares the set count number with the count number of the clock counter circuit. In this event, the monitor start circuit can be implemented in a simple configuration which restarts the temporarily stopped input monitoring circuit when the count number of the clock counter circuit reaches the predetermined number.

Also, since the register circuit updatably stores the count number of the externally fed clock, a desired count number can be set in the register circuit, so that the security level can be freely adjusted, thereby making it possible to satisfy both a user who prefers power saving to security and a user who prefers security to power saving.

In a data processing system of the present invention, since a data processing terminal station externally feeds the data processing apparatus of the present invention with a variety of data, a variety of signals, and a clock signal, the data processing apparatus of the present invention can communicate data with the data processing terminal station to execute a variety of data processing.

The above and other objects, features and advantages of the present invention will become apparent from the following description with reference to the accompanying drawings which illustrate examples of the present invention.

DETAILED DESCRIPTION OF THE PREFERRED EMBODIMENTS

Figure 1:
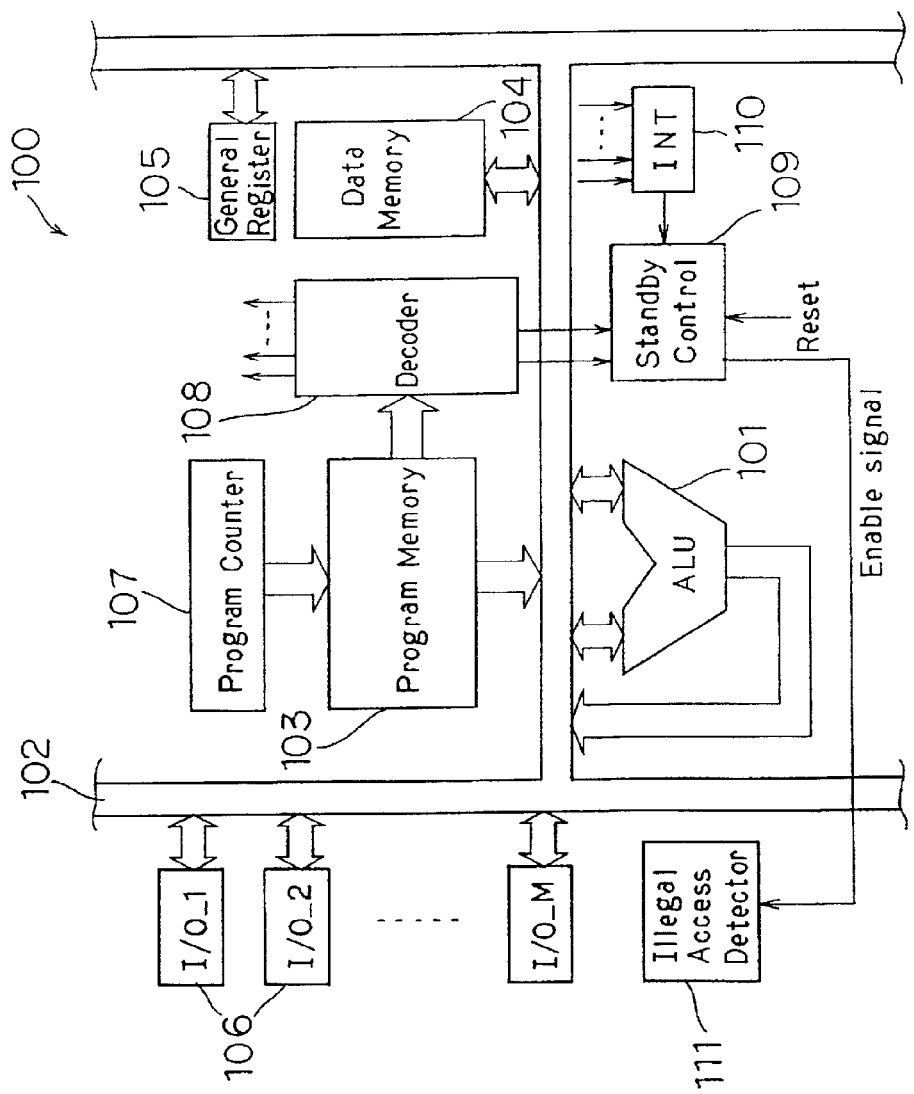
FIG. 1 is a block diagram illustrating a main portion of a data processing apparatus according to a prior art example.

Embodiments of the present invention will hereinafter be described with reference to FIGS. 2 through 4, wherein parts in the embodiments identical to those in the aforementioned prior art example are designated the same names and reference numerals, and detailed description thereon is omitted.

First, data processing apparatus 200 according to one embodiment is formed as a component of data processing system 400, together with separate data processing terminal station 300, and is implemented as a portable apparatus which is mounted to data processing terminal station 300 and operated integrally therewith, similarly to data processing apparatus 100 described above as a prior art example.

Data processing terminal station 300 has external output terminal 301 for feeding a variety of data and a variety of signals to the outside; and clock output terminal 302 for feeding a clock signal to the outside. Data processing apparatus 200 in turn has external input terminal 201 for receiving a variety of data and a variety of signals from the outside; and clock input terminal 202 for receiving a clock signal from the outside.

Figure 2:
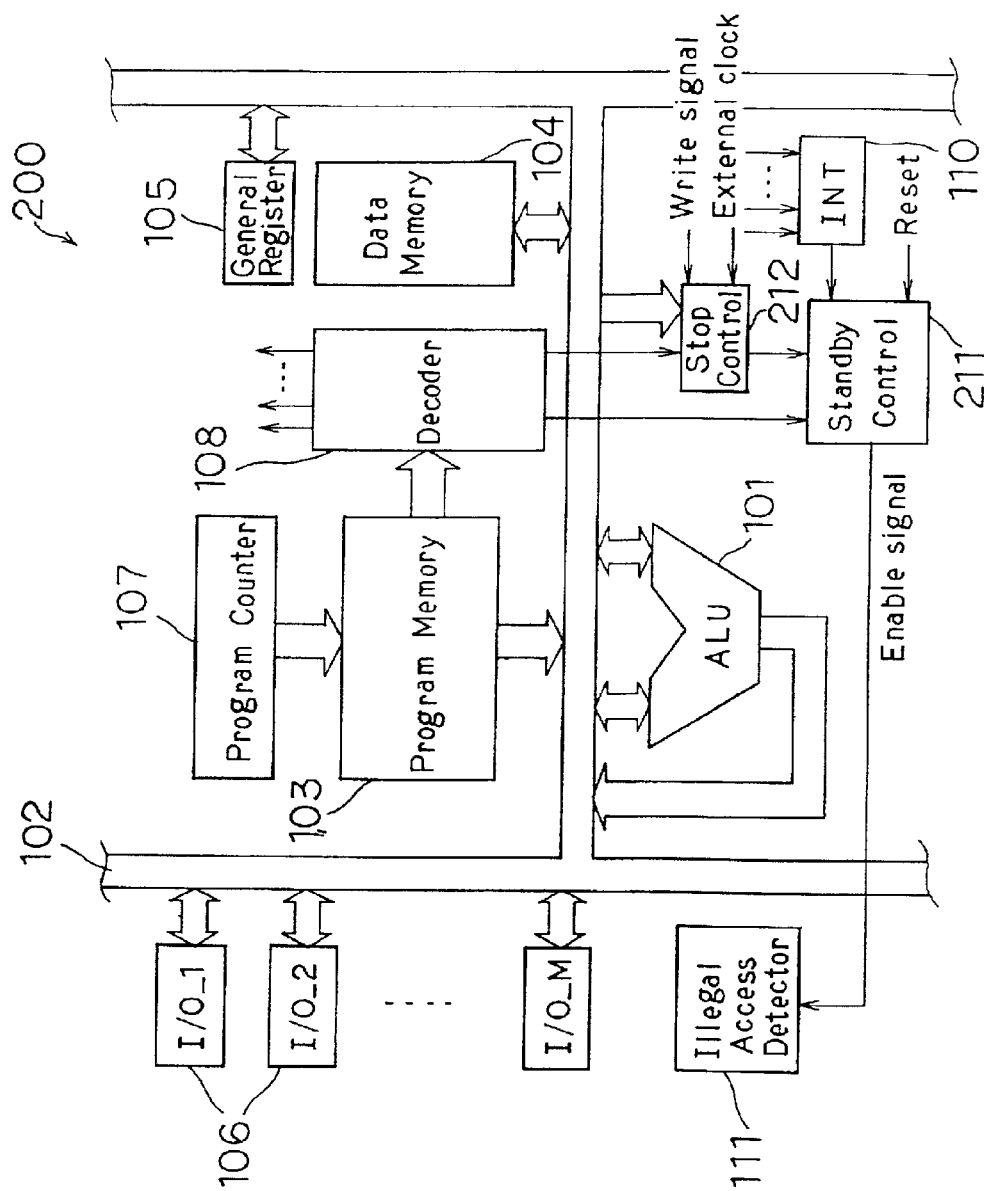
FIG. 2 is a block diagram illustrating a main portion of a data processing apparatus according to one embodiment of the present invention.

Further, as shown in FIG. 2, data processing apparatus 200 of this embodiment also has ALU 101 as a data processing circuit, program memory 103, data memory 104, general register 105, a plurality of I/Os 106, and so on connected to bus line 102, and program memory 103 is connected to program counter 107 and decoder 108, similarly to data processing apparatus 100 described above as a prior art example.

Decoder 108 is connected to standby controller 211, which functions as an operation control circuit, and standby controller 211 is connected to INT 110 and IAD 111 which functions as an input monitor circuit. However, unlike data processing apparatus 100 described above as a prior art example, stop control circuit 212 is inserted in a communication path through which a stop signal is sent from decoder 108 to standby controller 211.

Figure 3:
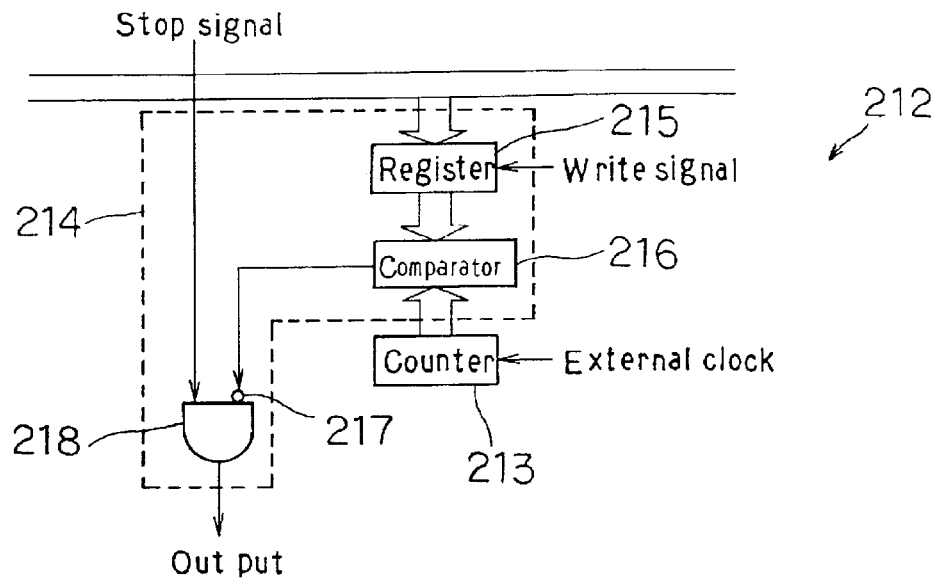
FIG. 3 is a circuit diagram illustrating the internal configuration of a stop control circuit.

As shown in FIG. 3, stop control circuit 212 comprises clock counter circuit 213 and monitor start circuit 214.

Monitor start circuit 214 comprises register circuit 215, comparator circuit 216, invertor device 217, and AND gate 218.

Clock counter circuit 213 counts a clock signal fed through clock input terminal 202 from the outside while standby controller 211 temporarily stops IAD 111 and ALU 101.

Register circuit 215 updatably stores the count number of the externally fed clock signal, and comparator circuit 216 compares a count number set in register circuit 215 with the count number of clock counter circuit 213.

Invertor device 217 inverts the result of comparison from comparator circuit 216, and supplies the inverted result to one of a pair of input terminals of AND gate 218. AND gate 218 inverts a stop signal supplied to standby controller 211 in response to the data supplied thereto.

Like standby controller 109 in the aforementioned prior art example, standby controller 211 temporarily stops the components such as IAD 111, ALU 101, I/Os 106, and otherwise in response to a predetermined condition, and restarts the temporarily stopped component in response to a predetermined condition.

However, unlike standby controller 109 in the prior art example, standby controller 211 is responsive to inversion of the stop signal, when components such as IAD 111, ALU 101 I/Os 106, and otherwise are temporarily stopped, to restart IAD 111 alone while maintaining ALU 101, I/Os 106 and so on in a stopped state.

Figure 4:
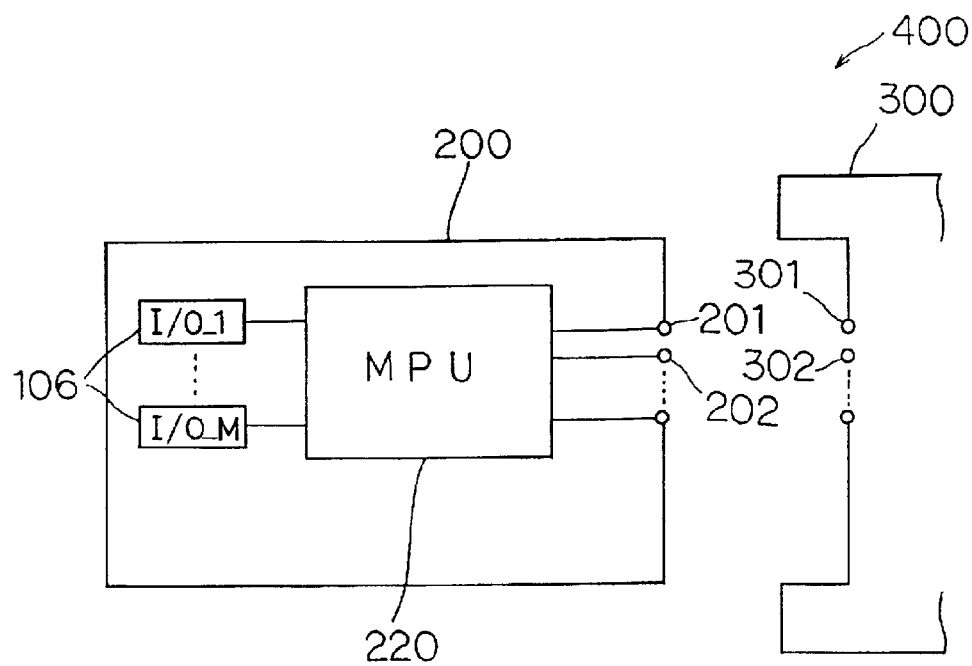
FIG. 4 is a schematic diagram illustrating a data processing system according to one embodiment of the present invention.

As shown in FIG. 4, data processing apparatus 200 of this embodiment actually has the foregoing main circuits integrated as single MPU (Microprocessor Unit) 220 to which are connected a plurality of I/Os 106, a variety of input terminals 201, 202, and so on.

In the configuration as described above, data processing apparatus 200 of this embodiment can execute a variety of data processing in accordance with a variety of data and clock signals externally fed thereto from separate data processing terminal station 300, similarly to data processing apparatus 100 of the prior art example.

In addition, data processing apparatus 200 can temporarily stop the components such as ALU 101, IAD 111, and otherwise to prevent useless power consumption, restore a normal operative state from the stopped state through restarting, and deal with illegal external inputs by the action of IAD 111 in a normal operative state.

However, data processing apparatus 200 of this embodiment differs from data processing apparatus 100 of the prior art in that as a clock signal is fed from the outside in a stopped state, the clock signal is counted by clock counter circuit 213, and the count number is compared with the count number set in register circuit 215 by comparator circuit 216.

As the count number of the clock signal reaches the count number set in register circuit 215, the stop signal is inverted by AND gate 218, so that standby controller 211 restarts IAD 111 alone in response to the inversion while maintaining ALU 101 and otherwise in a stopped state.

Thus, data processing apparatus 200 of this embodiment can deal with illegal external inputs because IAD 111 is restarted when the externally fed clock signal reaches a predetermined number even in a stopped state, thereby providing good security even in a stopped state.

Even with the good security, IAD 111 is not left operated continuously in a stopped state, so that the power will not be uselessly consumed in a stopped state. Moreover, since a desired count number can be set in register circuit 215, the security level can be freely adjusted, thereby making it possible to satisfy both of a user who prefers power saving to security and a user who prefers security to power saving.

The foregoing embodiment has shown that standby controller 211 restarts only IAD 111 in a stopped state as stop control circuit 212 inverts the stop signal in a stopped state. Alternatively, stop control circuit 212 may directly restart IAD 111 in a stopped state without intervention of standby controller 211.

While preferred embodiment of the present invention has been described using specific terms, such description is for illustrative purposes only, and it is to be understood that changes and variations may be made without departing from the spirit or scope of the following claims.

What is claimed is:

1. A data processing apparatus comprising:

a program memory which stores an operation program comprised of a variety of instructions;

an external input terminal fed with a variety of data and a variety of signals from the outside;

a clock input terminal fed with a clock signal from the outside;

a data processing circuit for executing a variety of data processing in synchronization with the clock signal fed through said clock input terminal from the outside in accordance with a variety of data fed through said external input terminal from the outside and the operation program stored in said program memory;

an input monitor circuit for monitoring the variety of data and the variety of signals fed through said external input terminal from the outside to execute a predetermined counter-operation upon determining that the data or signals are improper;

an operation control circuit for controlling operations involved in temporarily stopping and restarting said input monitor circuit and said data processing circuit;

a clock counter circuit for counting the clock signal fed through said clock input terminal from the outside when said operation control circuit temporarily stops said input monitor circuit and said data processing circuit; and a monitor start circuit for restarting said input monitor circuit temporarily stopped by said operation control circuit when a count number of said clock counter circuit reaches a predetermined number.

2. The data processing apparatus according to claim 1, wherein:

said monitor start circuit includes:

a register circuit in which a predetermined count number is set; and a comparator circuit for comparing the count number set in said register circuit with the count number of said clock counter circuit.

3. The data processing apparatus according to claim 2, wherein said register circuit updatably stores the count number of the clock fed from the outside.

4. A data processing system comprising:

the data processing apparatus according to claim 1; and a data processing terminal station for feeding the variety of data and the variety of signals to the external output terminal of said data processing apparatus and feeding the clock signal to the clock input terminal of said data processing apparatus.

* * * * *